(12) United States Patent
Lim et al.

(10) Patent No.: US 11,341,701 B1
(45) Date of Patent: May 24, 2022

(54) METHOD AND APPARATUS FOR PRODUCING A COMPOSITE IMAGE OF A SUSPECT

(71) Applicant: MOTOROLA SOLUTIONS, INC., Chicago, IL (US)

(72) Inventors: Bing Qin Lim, Jelutong (MY); Yanlin Han, Naperville, IL (US); Jean-Yves Poulin, Gatineau (CA); Zhe Qian Goh, Simpang Ampat (MY)

(73) Assignee: MOTOROLA SOLUTIONS, INC, Chicago, IL (US)

( * ) Notice: Subject to any disclaimer, the term of this patent is extended or adjusted under 35 U.S.C. 154(b) by 0 days.

(21) Appl. No.: 17/302,551

(22) Filed: May 6, 2021

(51) Int. Cl.
| | |
|---|---|
| *G06F 3/0482* | (2013.01) |
| *G06T 11/60* | (2006.01) |
| *G06K 9/62* | (2022.01) |
| *G06T 5/00* | (2006.01) |
| *G06T 5/50* | (2006.01) |

(52) U.S. Cl.
CPC ............ *G06T 11/60* (2013.01); *G06F 3/0482* (2013.01); *G06K 9/6215* (2013.01); *G06T 5/002* (2013.01); *G06T 5/50* (2013.01); *G06T 2200/24* (2013.01); *G06T 2207/20212* (2013.01); *G06T 2207/30196* (2013.01)

(58) Field of Classification Search
CPC . G06T 11/60; G06T 5/002; G06T 5/50; G06F 3/0482; G06K 9/6215
See application file for complete search history.

(56) References Cited

U.S. PATENT DOCUMENTS

| | | | |
|---|---|---|---|
| 8,401,252 B2 | 3/2013 | Schneiderman et al. | |
| 9,762,651 B1 | 9/2017 | Sharifi et al. | |
| 10,242,282 B2 | 3/2019 | Loce et al. | |
| 10,630,937 B1 | 4/2020 | Low et al. | |
| 2004/0049780 A1 | 3/2004 | Gee | |
| 2006/0023923 A1* | 2/2006 | Geng | G06T 19/20 382/116 |

(Continued)

FOREIGN PATENT DOCUMENTS

KR            101943433 B1     1/2019

OTHER PUBLICATIONS

T. Orekondy, M. Fritz and B. Schiele, "Connecting Pixels to Privacy and Utility: Automatic Redaction of Private Information in Images," 2018 IEEE/CVF Conference on Computer Vision and Pattern Recognition, Salt Lake City, UT, 2018, pp. 8466-8475, doi: 10.1109/CVPR.2018.00883.

(Continued)

*Primary Examiner* — Anil K Bhargava

(57) ABSTRACT

A method and apparatus for creating a composite image of a person is provided herein. During operation, a witness is presented with a plurality of attributes of an individual. A witness selection of an attribute is received from the presented attributes. Images of individuals who were at an incident scene at a time of the incident are received and analyzed to determine images of those individuals with attributes similar to the attribute selected by the witness. The images of those individuals with the attributes similar to the attribute selected by the witness are processed by redacting information from the images to produce a plurality of processed images. The witness is then presented with the plurality of processed images.

12 Claims, 6 Drawing Sheets

(56) References Cited

U.S. PATENT DOCUMENTS

| | | | |
|---|---|---|---|
| 2007/0052726 A1* | 3/2007 | Wright | G06T 11/00 |
| | | | 345/419 |
| 2008/0064333 A1* | 3/2008 | Hymes | H04L 67/14 |
| | | | 455/414.3 |
| 2016/0342846 A1* | 11/2016 | Gordon | G06V 20/52 |
| 2019/0364126 A1 | 11/2019 | Todd | |
| 2020/0027200 A1* | 1/2020 | Celestini | G06V 10/25 |
| 2020/0042797 A1 | 2/2020 | Lee et al. | |
| 2020/0051228 A1* | 2/2020 | Jin | G06T 5/50 |
| 2021/0279515 A1* | 9/2021 | Zhang | G06V 40/172 |

OTHER PUBLICATIONS

Zajac, Tomasz, et al.: "Call Management System for Incoming video Calls at a Command Center", application serial No. PCT/PL2019/050080 filed; Dec. 20, 2019, all pages.

Lim, Bing Qin, et al.: "System and Method for Emergency Call Taker Mental Health Mprovement", filed: Dec. 11, 2020, all pages.

Lahlali, S.E. & Sadiq, Abdelalim & Mbarki, Samir. (2015). A review of face sketch recognition systems. 81. 255-265.

S. Klum, H. Han, A. K. Jain and B. Klare, "Sketch based face recognition: Forensic vs. composite sketches," 2013 International Conference on Biometrics (ICB), 2013, pp. 1-8, doi: 10 1109/ICB. 2013.6612993.

\* cited by examiner

METHOD AND APPARATUS FOR PRODUCING A COMPOSITE IMAGE OF A SUSPECT

BACKGROUND OF THE INVENTION

Oftentimes, the most important outcome when interviewing a witness to a crime is the creation of a composite image of a suspect (i.e., an image of a suspect made from multiple different images of individual parts of a face). The creation of a composite image often takes a lot of time, and can be very difficult for the untrained witness. It would be beneficial if there were a method and apparatus for generating such composite images of suspects that made the process easier and quicker for the witness.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
FIG. 1 illustrates the generation of a composite image.
Figure 1:
Figure 1:
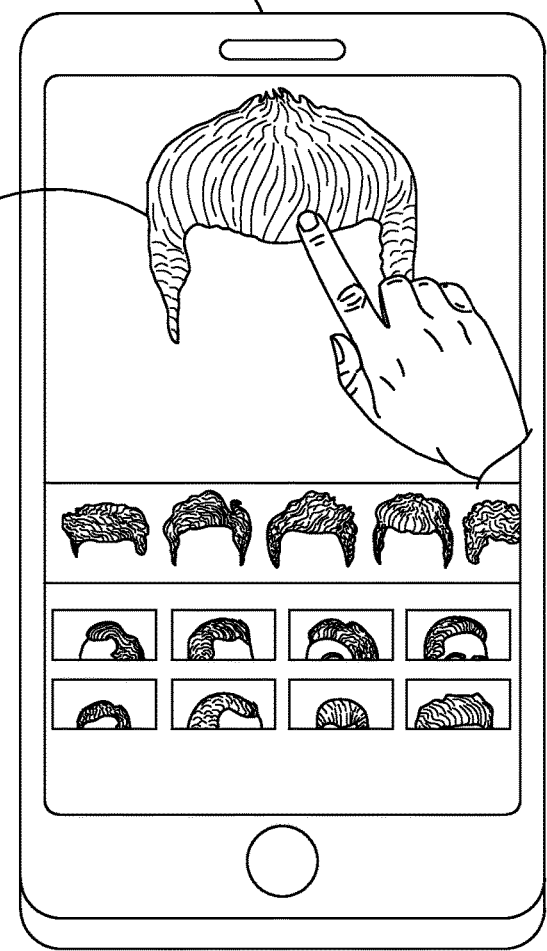

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In order to the generation of a composite image easier for the witness, a method and apparatus for creating a composite image of a person is provided herein. During operation, a witness is presented with a plurality of attributes of an individual. A witness selection of an attribute is received from the presented attributes. Images of individuals who were at an incident scene at a time of the incident are received and analyzed to determine images of those individuals with attributes similar to the attribute selected by the witness. The images of those individuals with the attributes similar to the attribute selected by the witness are processed by redacting information from the images to produce a plurality of processed images. The witness is then presented with the plurality of processed images. The witness can then update their attribute choice with one from the plurality of processed images.

The above procedure allows the witness to have more choices when choosing attributes, and presumably more accurate choices since the attributes presented to the witness may contain actual attributes from the suspect involved in the incident.

Figure 2:
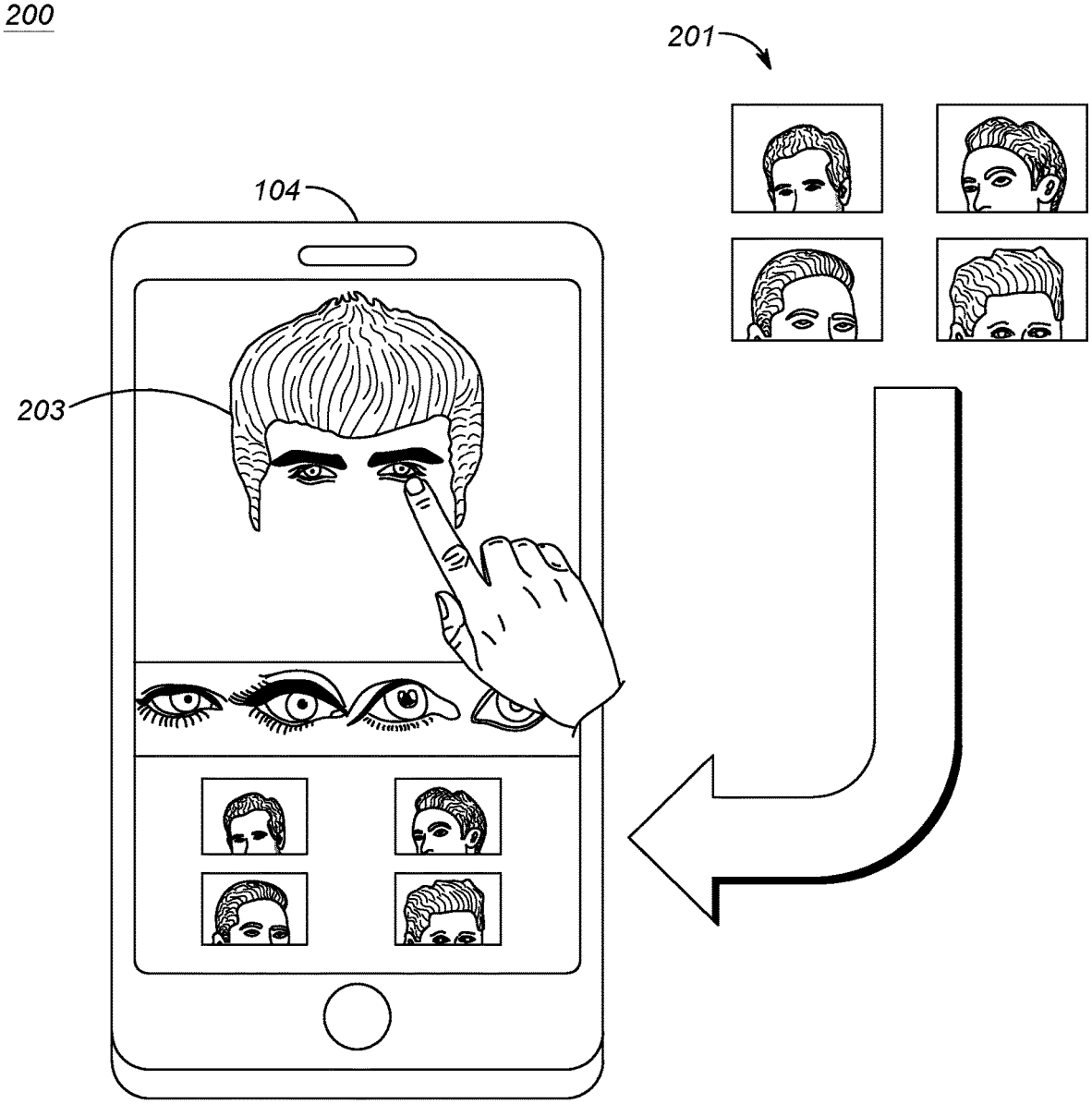
FIG. 2 illustrates the generation of a composite image.
Figure 3:
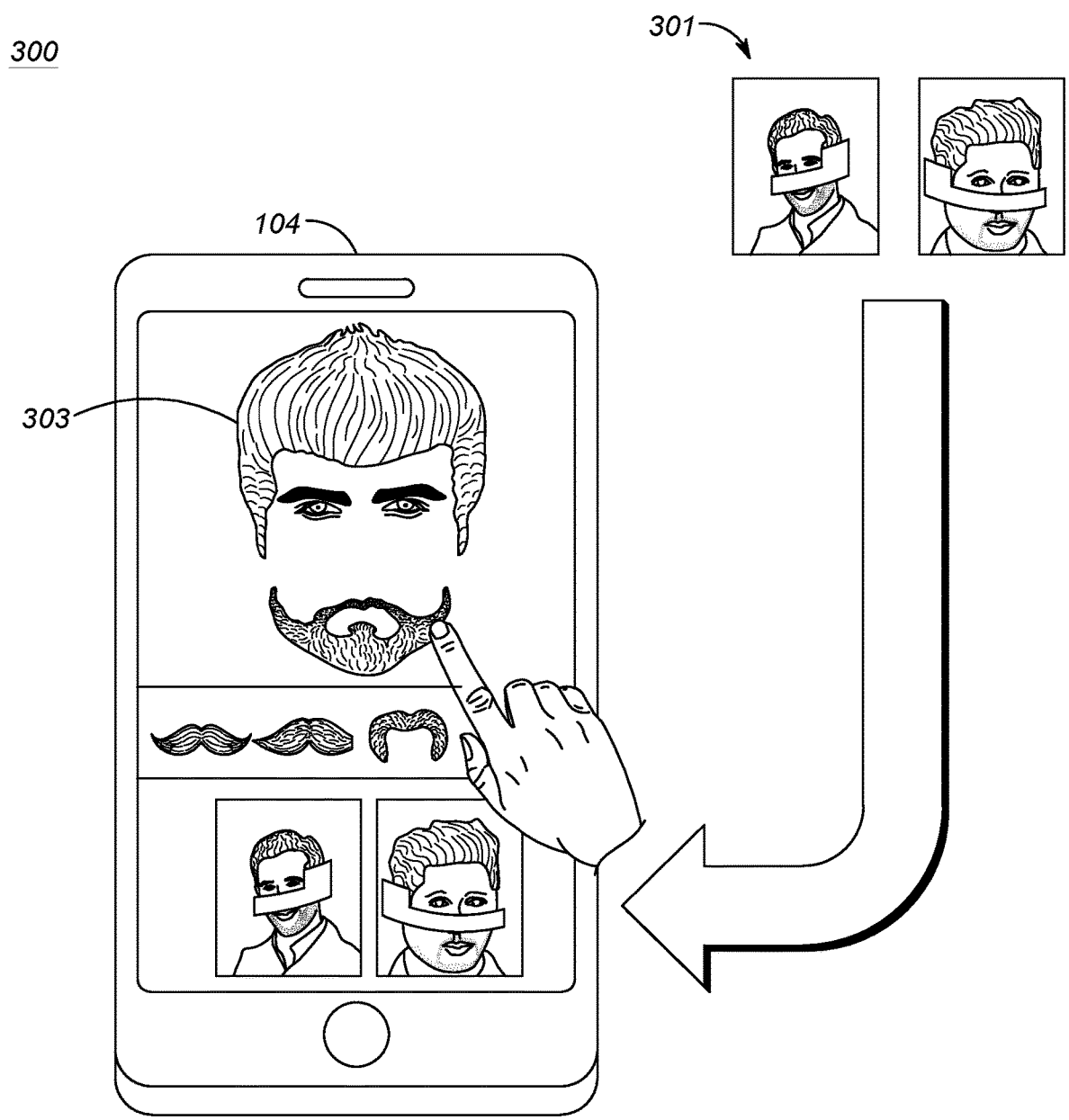
FIG. 3 illustrates the generation of a composite image.

The above process for creating a composite image is illustrated in FIG. 1 through FIG. 3. In FIG. 1 through FIG. 3, a smart phone 104 is used as a user interface to display images of attributes, although other interfaces (e.g., computer monitor, television, . . . , etc.) may be utilized. During operation a plurality of attributes are presented to a user. In FIG. 1, using hairstyle as an attribute, a plurality of hairstyles 100 is presented to the user, while in FIG. 2 and FIG. 3 a plurality of eye types 200 and facial hair types 300 are presented to the user. When the user chooses a particular attribute that is most similar to the suspect, a database of images of people in database 102 that were at the incident scene at the time of the incident is accessed and those individuals with a similar attribute (e.g., a similar hairstyle) will have their redacted images presented to the user. The user may then choose to update their selection by choosing one of the redacted images as an attribute most similar to the suspect.

One reason that redacted images are shown to the witness is to have the witness choose a more accurate attribute since images from database 102 are highly likely contain an image of the suspect involved in the incident. Additionally, presenting an un-redacted image to the witness may influence the witness in choosing other attributes.

In FIG. 1, a witness to an incident is presented with a plurality of hairstyles 100, and has chosen a hairstyle 103 (attribute=hairstyle) that closely matches the suspect. The witness is then (at a later time, and after choosing the original hairstyle 103) presented with a plurality of hairstyles 101 taken from individuals that were at the incident scene at the time of the incident. The incident can be determined based on police officer input or a witness selection of an incident (e.g. incident type, incident identifier, CAD (computer aided dispatch) identifier, incident location, incident date & time) or automatically determined based on a police officer's job assignment status that can be retrieved from a Dispatch System or CAD system.

In the example of FIG. 1, the plurality of hairstyles 101 are presented to the witness because of their similarity to hairstyle 103. The hairstyles 101 presented to the witness will have all other image data redacted from the images, so that just the hairstyles 101 from individuals that were at the incident scene at the time of the incident is shown to the witness. The witness can then have the option to update his or her selection of the hairstyle 103 with one of the redacted images 101 presented to the witness.

Once the hairstyle is chosen, the witness is then presented with a second attribute 200 (FIG. 2), in this case an eye types 200. The witness has chosen an eye type 203 that closely matches the suspect and is then at a later time presented with a plurality of eye types 201 taken from individuals that were at the incident scene at the time of the incident. Again, the plurality of eye types 201 are presented to the witness because of their similarity to the chosen eye type 203 that most closely matches the suspect. The eye types 201 presented to the witness will have all other image data redacted from the image, so that just the eyes from individuals that were at the incident scene at the time of the incident is shown to the witness. In an alternate embodiment of the present invention, redaction will not take place on attributes already chosen by the witness (thus, in this example, the hair and eyes will be shown, with all other image data redacted). The witness may choose an eye type of one of the presented redacted images 201. In one example, the plurality of images 201 presented to the witness are chosen because all the selected attributes (in this example, both the selected hairstyle & eye type) are closely matched to attributes selected by the witness.

Once the eye type is chosen, the witness is then presented with a third attribute (FIG. 3), in this case facial hair type 300. The witness has chosen a facial hair type 303 that closely matches the suspect and is then presented with a plurality of facial hair types 301 taken from individuals that were at the incident scene at the time of the incident. Again, the plurality of facial hair types 301 presented to the witness is based on their similarity to the chosen facial hair type 303. The facial hair types 303 presented to the witness will have all other witness data redacted from the image, so that just the facial hair from individuals that were at the incident scene at the time of the incident is shown to the witness. In an alternate embodiment of the present invention, redaction will not take place on attributes already chosen by the witness. The witness may choose a facial hair type of one of the presented redacted images 301. In one example, the plurality of images 301 presented to the witness are chosen because all the selected attributes (in this example, all the selected hairstyle, eye type and facial hair type) are closely matched.

The above process continues until enough attributes are presented to the witness to generate a composite image of a suspect. Once enough attributes are selected by the witness, a composite image of the suspect may be generated with all of the selected attributes. In one example, the composite image can be automatically sent to police system to generate Be-On-The-Lookout (BOLO) or All-Points-Bulletin (APB) identifier to be loaded to plurality of public safety cameras for a search on the suspect using video analytics. In one example, the composite image and/or the plurality of matched images can be shown without redaction and observed by the police on another connected device, with location information of each of the plurality images or the location of the detected suspect from the BOLO/APB search.

Thus, the process above presents generic images (100, 200, 300) of attributes to a witness. Once the witness chooses an attribute that matches a suspect, other redacted images (101, 201, 301) are then presented to the user at a later time. As discussed these other redacted images 101, 201, 301 are images of attributes from those individuals that were at the incident scene at the time of the incident.

Figure 4:
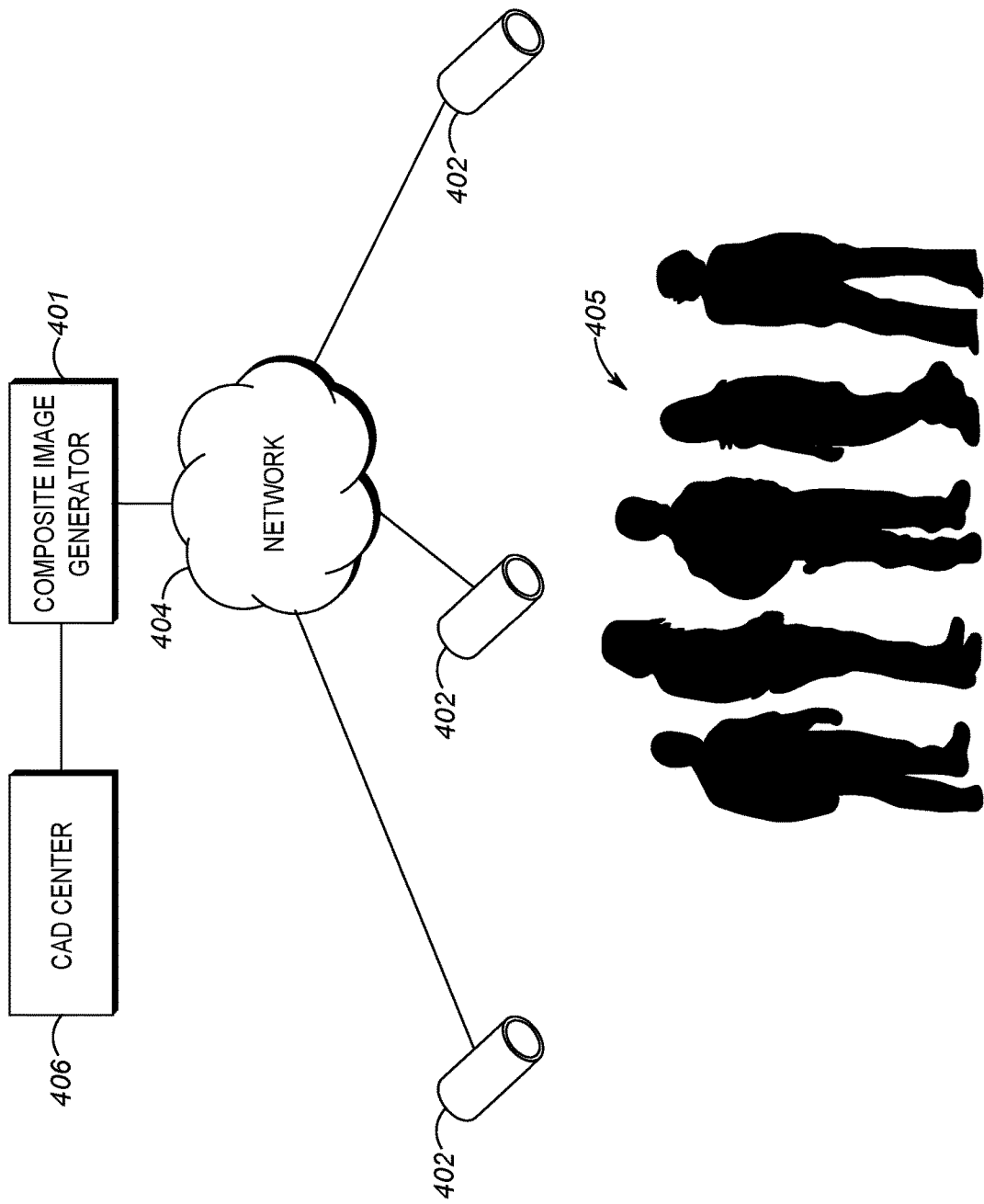
FIG. 4 is a block diagram of a general operating environment.

FIG. 4 illustrates a general operating environment of the present invention. As shown, the environment is equipped with multiple cameras 402 positioned to capture individuals as they roam through a field of view of a camera 402. Each camera 402 has a spatial area that the camera can view, referred to as a view shed. The view shed is based on the geographical location of the camera, mounting height, and pan-tilt-zoom capabilities of the camera while also accounting for physical obstructions of the field of view. Cameras 402 may comprise stationary cameras mounted on, for example, light posts, may comprise police body-worn cameras, or may comprise any other camera that is capable of generating an image of an individual at an incident scene (e.g., a citizen captured video of the incident using smart phone).

Composite image generator 401 is provided. Generator 401 is configured to generate a composite image of a suspect as described above. More particularly, generator 401 will store images of individuals 405 for utilization in generating a composite image as described in FIG. 1 through FIG. 3.

Cameras 402 are attached (i.e., connected) to generator 401 through network 404 via network interface. Example networks include any combination of wired and wireless networks, such as Ethernet, T1, Fiber, USB, IEEE 802.11, 3GPP LTE, and the like. During operation, generator 401 receives feeds from multiple cameras 402, and then stores images of individuals along with their location and time of capture. In an alternate embodiment of the present invention, all images obtained at an incident scene are manually input into composite image generator 401. Thus, in the alternate embodiment of the present invention, cameras 402 are not physically connected to generator 401, but will have images of individuals manually input into generator 401 by an operator. Generator 401 is configured to maintain a database of images of individuals 405. Generator 401 can be connected to Computer Aided Dispatch (CAD) system 406 to retrieve information of the incident currently being assigned to the police officer or information on incidents that the witness is involved.

Figure 5:
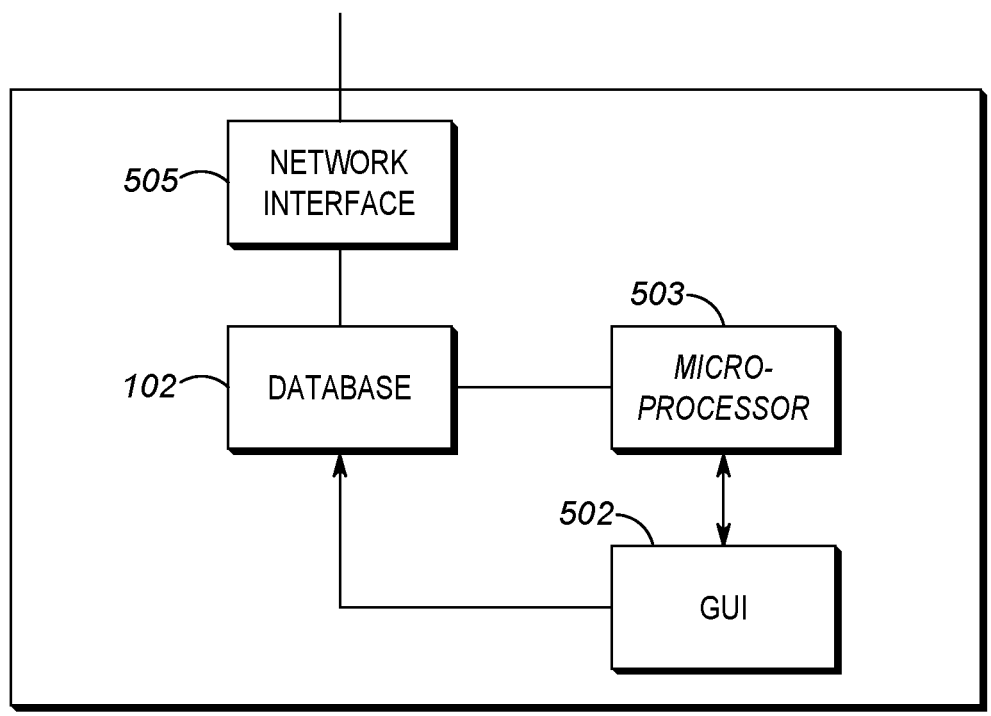
FIG. 5 is a block diagram of a composite image generator.

FIG. 5 is a block diagram of generator 401 of FIG. 4. As shown, generator 401 comprises logic circuitry 503, database 102, graphical-user interface (GUI) 502, and network interface 505. FIG. 5 shows those components (not all necessary) for generator 401 to generate a composite image of a suspect as described above.

Database 102 may function to store images of individuals who were physically present at an incident scene during a particular incident. As discussed above, the images of individuals may be received from network interface 505 along with location and a time the image was obtained. Alternatively, the images of individuals may be manually loaded into database 102 via GUI 502. With this in mind, database 102 comprises standard memory (such as RAM, ROM, . . . , etc.) and serves to store images of individuals.

GUI 502 provides a man/machine interface for displaying information. For example, GUI 502 may provide a way to present images of individuals (redacted or un-redacted) to a witness, and receive a selection of attributes from the witness. GUI 502 may comprise any combination of a touch screen, a video camera, keyboard, touch pad, or any other means for presenting images to a witness and obtaining a witness selection. GUI also includes a data bus for uploading images to database 102.

Network interface 505 includes elements including processing, modulating, and transceiver elements that are operable in accordance with any one or more standard or proprietary wireless interfaces, wherein some of the functionality of the processing, modulating, and transceiver elements may be performed by means of the processing device 503 through programmed logic such as software applications or firmware stored on database 102 or through hardware. Examples of network interfaces (wired or wireless) include Ethernet, T1, USB interfaces, IEEE 802.11b, IEEE 802.11g, etc. Network interface 505 serves as means for logic circuitry 503 to obtain image/video data from cameras 402. Finally, logic circuitry 503 comprises a digital signal processor (DSP), general purpose microprocessor, a programmable logic device, or application specific integrated circuit (ASIC) and is configured to receive images of individuals who were at an incident scene at a time of the incident, analyze the images of the individuals at the incident scene at the time of the incident to determine images of those individuals with attributes similar to the attribute selected by the witness, process the images of those individuals with the attributes similar to the attribute selected by the witness by redacting information from the image to produce a plurality of processed images, present the witness with the plurality of processed images, and receive an updated selection of the attribute from the witness.

With the above in mind, generator 401 comprises an apparatus comprising a graphical-user interface 502 configured to present a witness with a plurality of attributes of an individual. These attributes originally presented are preferably standard images of attributes, wherein the images are not taken at the incident scene. Graphical-user interface 502 is configured to receive a witness selection of an attribute from the presented attributes. Logic circuitry 503 is provided the selected attribute and configured to receive images of individuals who were at an incident scene at a time of the incident, analyze the images of the individuals at the incident scene at the time of the incident to determine images of those individuals with attributes similar to the attribute selected by the witness, process the images of those individuals with the attributes similar to the attribute selected by the witness by redacting information from the images to produce a plurality of processed images and present the witness with the plurality of processed images. The plurality of processed images subsequently presented to the witness are preferably images of attributes, wherein the images are taken at the incident scene.

As discussed, the graphical-user interface 502 is further configured to receive a witness selection of an image from the processed images, wherein the logic circuitry is further configured to generate a composite image of the person by using the selected image from the processed images.

Additionally, the graphical-user interface 502 is configured to present the witness with the plurality of attributes by presenting the witness with a plurality of hairstyles, hair colors, noses, lips, ears, clothing colors, clothing types, and shoe styles.

Additionally, the plurality of attributes comprise a plurality of physical attributes.

Additionally, the information redacted from the images comprises information other than the attribute shown in the image. In other words, preferably, only an image of the attribute is shown to the witness, with all other data either blurred out or completely redacted.

Figure 6:
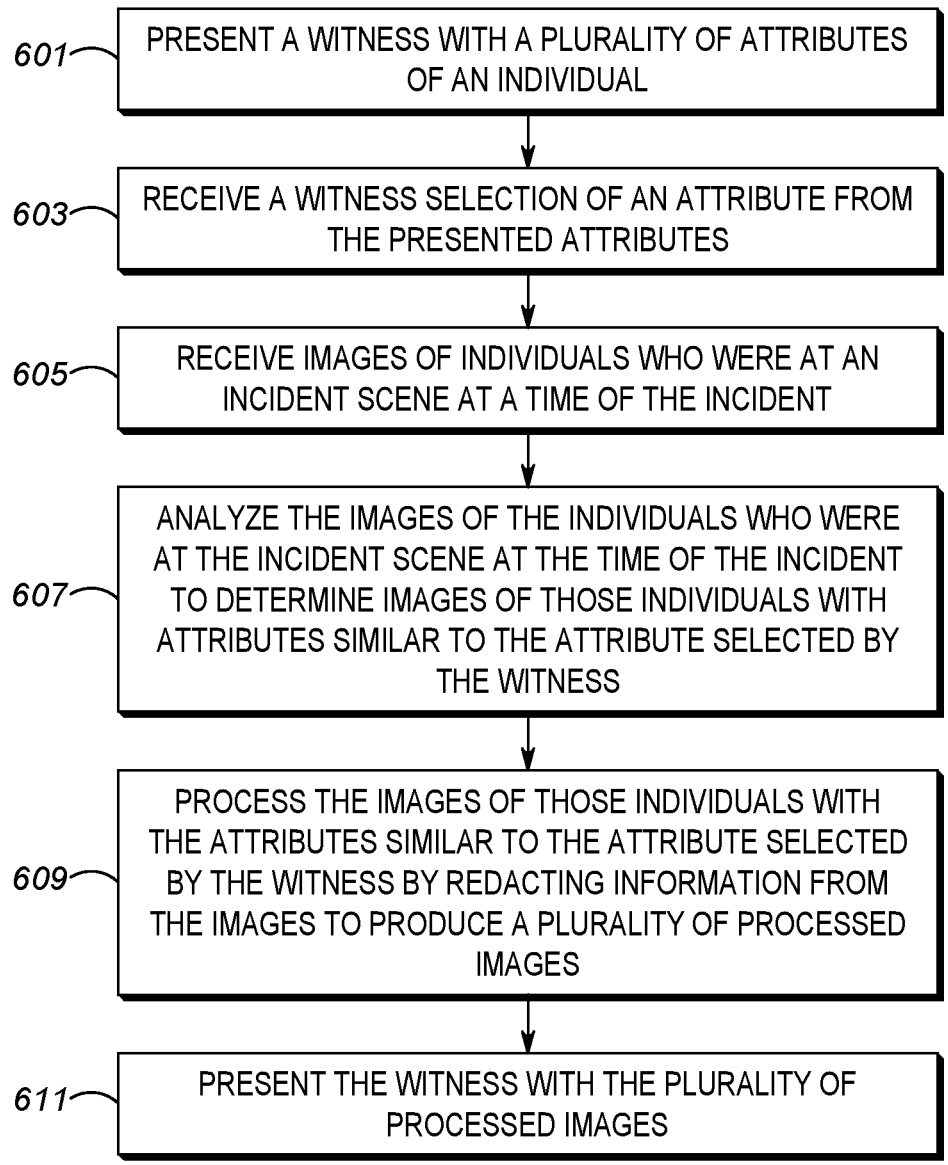
FIG. 6 is a flow chart showing operation of the composite image generator of FIG. 5.

FIG. 6 is a flow chart showing operation of the apparatus shown in FIG. 5. The logic flow begins at step 601 where logic circuitry 503 sends GUI 502 a plurality of images of attributes of an individual to present to a witness. As discussed above, the plurality of images originally presented to the witness comprises generic images of attributes of individuals that were not at the incident scene.

At step 603 GUI 502 receives a witness selection of an attribute from the presented attributes. At step 605, logic circuitry 503 accesses database 102 and receives images of individuals who were at an incident scene at a time of the incident, analyzes the images of the individuals who were at the incident scene at the time of the incident to determine images of those individuals with attributes similar to the attribute selected by the witness (step 607), and processes the images of those individuals with the attributes similar to the attribute selected by the witness by redacting information from the images to produce a plurality of processed images of attributes (step 609). Finally, at step 611 logic circuitry 503 sends the plurality of processed images of attributes to GUI 502 to be presented to the witness.

As discussed above, the plurality of processed images sent to the user at step 611 are presented to the user only after they have selected an attribute from the generic attributes originally presented to the user.

Thus, as described above, generic images of attributes are presented to the user. The user selects an image/attribute from the generic images of attributes. The user is then presented images of attributes taken from images obtained at the incident scene at the time of the incident. In order to pare down number of images subsequently presented to the user, the images of attributes taken from images obtained at the incident scene are only presented to the witness if they are similar to the image of the generic attribute selected by the witness. The witness may update their selection from the generic image of the attribute by choosing one of the subsequently presented images of the attributes. If this is the case, then GUI 502 will receive a second witness selection of an image from the processed images. Logic circuitry 503 may then generate the composite image of the person by using the second selected image from the processed images.

As discussed, the step of generating the composite image of the person by using the second selected image from the processed images may comprise the step of using the second selected image along with multiple other images to generate the composite image.

Additionally, the step of presenting the witness with the plurality of attributes of the individual may comprise the step of presenting the witness with images of attributes that are not sourced from the images of individuals at the incident scene.

Additionally, the step of presenting the witness with the plurality of attributes may comprise the step of presenting the witness with a plurality of hairstyles, hair colors, noses, lips, ears, clothing colors, clothing types, and shoe styles.

Additionally, the step of receiving images of individuals who were at the incident scene at the time of the incident may comprise the step of receiving the images from cameras that were present near the incident scene at the time of the incident.

Additionally, the step of redacting may comprise the step of blurring the images in areas other than the area of the selected attribute shown in the image.

Additionally, the step of redacting information may comprise the step of removing data from the images in areas other than the area of the selected attribute shown in the image.

Additionally, the plurality of attributes preferably comprise a plurality of physical attributes.

Finally, the information redacted from the images may comprise information other than the selected attribute shown in the image.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for generating a composite image of a person, the method comprising the steps of:
   presenting a witness with a plurality of images of attributes of individuals, wherein the step of presenting the witness with the plurality of images of attributes of the individuals comprises the step of presenting the witness with images of attributes that are not sourced from images of individuals at an incident scene;
   receiving an original witness selection of an image of an attribute from the presented images of attributes;
   receiving images of individuals who were at an incident scene at a time of the incident;
   analyzing the images of the individuals who were at the incident scene at the time of the incident to determine images of those individuals with attributes similar to the attribute image originally selected by the witness;
   processing the images of those individuals with the attributes similar to the image of the attribute selected by the witness by redacting information other than the attribute from the images to produce a plurality of processed images which contain the attribute; and
   presenting the witness with the plurality of processed images;
   receiving a second witness selection of an image from the processed images that replaces the original witness selection; and
   generating the composite image of the person by using the second selected image from the processed images.

2. The method of claim 1 wherein the step of generating the composite image of the person by using the second selected image from the processed images comprises the step of using the second selected image along with multiple other images to generate the composite image.

3. The method of claim 1 wherein the step of presenting the witness with the plurality of images of attributes comprises the step of presenting the witness with a plurality of images of hairstyles, hair colors, noses, lips, ears, clothing colors, clothing types, and shoe styles.

4. The method of claim 1 wherein the step of receiving images of individuals who were at the incident scene at the time of the incident comprises the step of receiving the images from cameras that were present near the incident scene at the time of the incident.

5. The method of claim 1 wherein the step of redacting information comprises the step of blurring the images in areas other than the area of the selected attribute shown in the image.

6. The method of claim 1 wherein the step of redacting information comprises the step of removing data from the images in areas other than the area of the selected attribute shown in the image.

7. The method of claim 1 wherein the plurality of attributes comprise a plurality of physical attributes.

8. The method of claim 1 wherein the information redacted from the images comprises information other than the selected attribute shown in the image.

9. An apparatus comprising:
 a graphical-user interface configured to:
  present a witness with a plurality of images of attributes of an individual wherein the step of presenting the witness with the plurality of images of attributes of the individuals comprises the step of presenting the witness with images of attributes that are not sourced from images of individuals at an incident scene; and
  receive an original witness selection of an image of an attribute from the presented images of attributes;
 a general purpose computing apparatus or specialized processing apparatus executing software instructions stored in non-transitory computer-readable memory configured to:
  receive images of individuals who were at an incident scene at a time of the incident;
  analyze the images of the individuals at the incident scene at the time of the incident to determine images of those individuals with attributes similar to the attribute selected by the witness;
  process the images of those individuals with the attributes similar to the image of the attribute selected by the witness by redacting information other than the attribute from the images to produce a plurality of processed images which contain the attribute;
  present the witness with the plurality of processed images;
  receive an updated witness selection of an image from the processed images that replaces the original witness selection; and
  wherein the general purpose computing apparatus or specialized processing apparatus is further configured to generate a composite image of a person by using the selected image from the processed images.

10. The apparatus of claim 9 wherein the graphical-user interface is configured to present the witness with the plurality of attributes by presenting the witness with a plurality of hairstyles, hair colors, noses, lips, ears, clothing colors, clothing types, and shoe styles.

11. The apparatus of claim 9 wherein the plurality of attributes comprise a plurality of physical attributes.

12. The apparatus of claim 9 wherein the information redacted from the images comprises information other than the attribute shown in the image.

* * * * *